Patented June 30, 1942

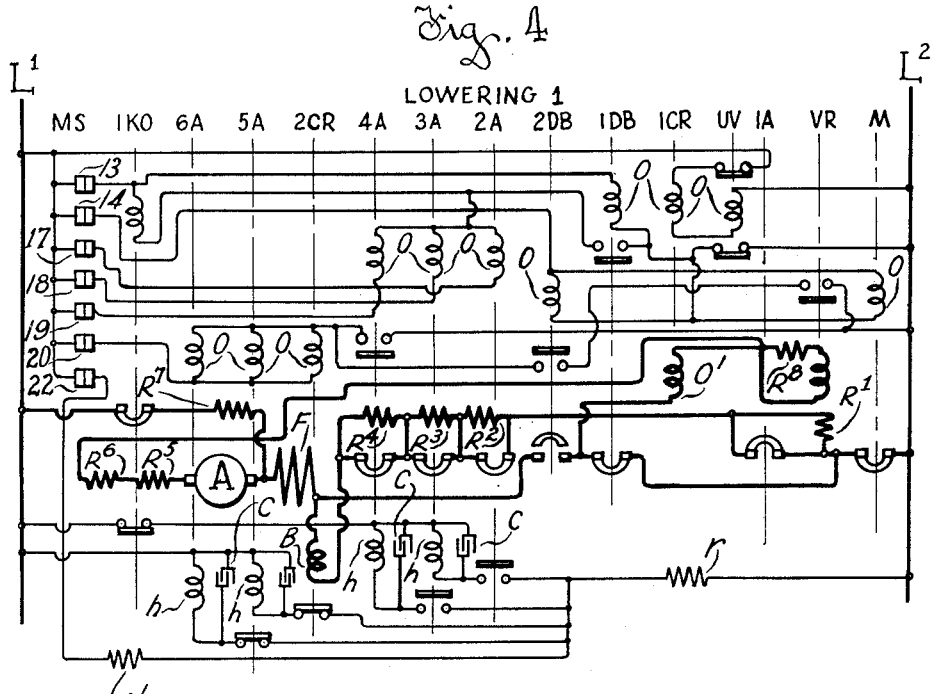

2,288,133

UNITED STATES PATENT OFFICE 2,288,133

DYNAMIC LOWERING CRANE CONTROLLER

Paisley B. Harwood and John M. Newman, Wauwatosa, Wis., assignors to Cutler-Hammer, Inc., Milwaukee, Wis., a corporation of Delaware Application April 28, 1941, Serial No. 390,770

16 Claims. (Cl. 172—179)

This invention relates to controllers for electric motors. While not limited thereto the invention is particularly applicable to controllers for direct current motors employed for crane hoists or similar apparatus, a type of such controller which heretofore has been used extensively being disclosed in our earlier Patent No. 1,860,671, May 31, 1932.

In the controller disclosed in our patent aforementioned provision is made for operating the controlled motor as a series motor during hoisting, and as a shunt motor during lowering. During lowering the motor effects dynamic braking under overhauling load conditions and the braking effect is regulated by means of resistors which in hoisting are utilized for acceleration purposes. Certain of the resistance controlling switches employed in accelerating and in regulation of dynamic braking are provided with means affording them an inductive time element, such means comprising an inductor. Also such controller includes means reducing the time element of certain resistance controlling switches in lowering as compared with the time element thereof in hoisting, this being found highly important in certain classes of service.

The present invention has among its objects to utilize in such a controller for affording the resistance control switches the desired time elements, condensers in lieu of the aforementioned inductor and to so utilize the condensers as to afford each of certain of the resistance controlling switches one time element for certain motor connections and a different time element for other motor connections.

Another object is to afford the same time element in accelerating in hoisting and lowering, and a different time element in decelerating in lowering.

Another object is to provide a controller which will eliminate the time element of certain of the resistance controlling switches when the master switch is operated in a certain way, as for example when the master switch is moved from hoisting position or off position to the first lowering position.

Various other objects and advantages of the present invention will hereinafter appear.

The accompanying drawings illustrate one embodiment of the invention which will now be described, it being understood that the embodiment illustrated is susceptible of various modifications without departing from the scope of the appended claims.

In the drawings:

Fig. 4 is a simplified diagram of circuits at one stage with the master switch in the first lowering position, and Fig. 5 is a chart showing switch sequence.

Figure 1:
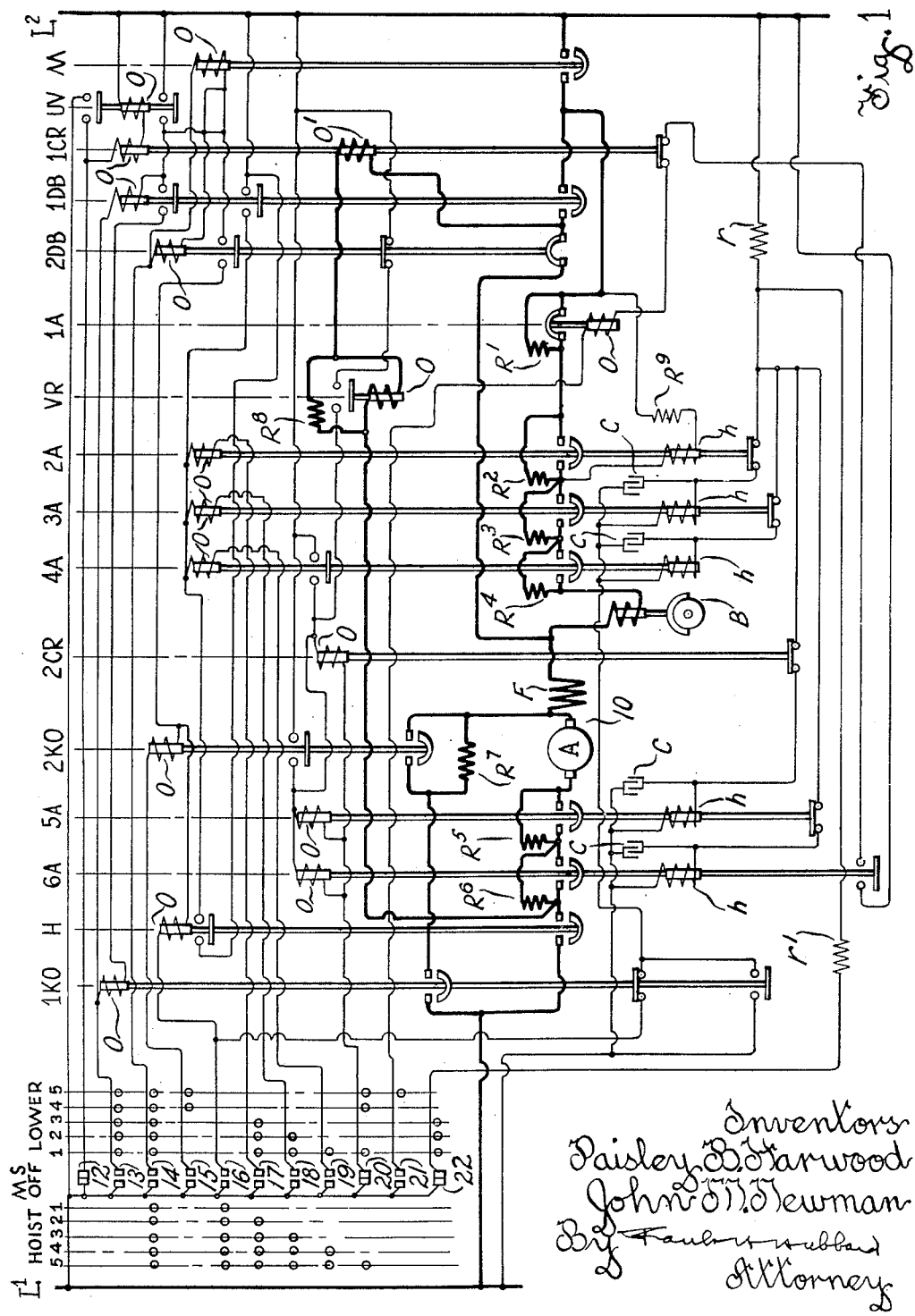
Figure 1 is a diagrammatic view of the complete controller except for omission of details, such for example as knife switches, overload switches, limit switches, etc.

Referring to Fig. 1, there is illustrated a motor 10 comprising an armature A and a series field winding F. This motor is provided with a series type electromagnetic brake B.

The motor 10 with its armature and field in a series relation is adapted to be connected to supply line $L^1$ by an electromagnetic hoist switch H and to line $L^2$ by an electromagnetic main switch M, the brake B being included in series with the motor. In circuit between the brake and switch M are resistors $R^1$, $R^2$, $R^3$ and $R^4$ and in circuit between the armature and switch H are resistors $R^5$ and $R^6$. These connections are for hoisting.

For lowering there is provided an electromagnetic switch 1KO to establish a circuit from a point between the motor armature and its field winding through a resistor $R^7$ to line $L^1$, switch M serving to connect the motor field winding through the winding of brake B to line $L^2$. This provides for excitation of the field and brake windings independently of the armature, the other terminal of the armature being adapted to be also connected to line $L^2$ by an electromagnetic switch 1DB which has a connection to the inside of main switch M. A normally closed dynamic braking circuit for the motor exclusive of the winding of brake B is afforded by a normally closed electromagnetic switch 2DB which completes a connection from the inside contact of switch 1DB to a point between the motor field winding F and the winding of brake B. This normally closed dynamic braking circuit includes the resistors $R^5$, $R^6$ and $R^8$, the latter being a permanently included resistor.

Electromagnetic switches 1A, 2A, 3A, 4A, 5A and 6A are provided respectively to control resistors $R^1$, $R^2$, $R^3$, $R^4$, $R^5$ and $R^6$, while an electromagnetic switch 2KO is provided to control resistor $R^7$ of the kickoff circuit. All of these electromagnetic switches as regards their main contacts shown of curved shape are of the normally open type except 1A which is normally closed. Switches 1A and 2KO, like the switches H, M, 1DB and 2DB hereinbefore mentioned are of the single winding type, the winding of each being designated by the letter o and constituting the operating winding whether the switch is normally open or normally closed. On the other hand, each of switches 2A, 3A, 4A, 5A and 6A is equipped with both an operating winding o and an additional holding winding h, each of the latter when energized tending to hold its respective switch against closing to afford it a time element in closing.

The holding winding of each of switches 3A, 4A, 5A and 6A has in shunt therewith a condenser C to delay decay of the magnetic flux of the holding winding in a well known manner when the winding circuit is interrupted. The holding winding thus affords its respective switch an inherently transient time element incident to closing, which time element may be varied by varying the amount of current supplied to the winding and condenser. The holding windings of switches 5A and 6A which are in parallel have a permanent connection to line $L^1$ while the holding windings of switches 3A and 4A which are in parallel have a connection to line $L^1$ controllable by auxiliary contacts of 1KO. All of these windings are permanently connected to line $L^2$ through a common resistor r. For timing in acceleration in hoisting or lowering the across the line connections through r are employed. On the other hand, in decelerating in lowering the resistor r is connected, as will later be explained, through a resistor $r^1$ to line $L^1$, thereby affording for the holding windings h potentiometer connections effecting reduction in current supplied thereto and to the condenser C, with a consequent reduction in time element of the delaying means afforded thereby. In practice the time element in decelerating in lowering has been thus reduced to one-half of the time element in accelerating, but as will be understood the difference may be modified as desired. In accelerating in lowering the holding windings of switches 5A and 6A are connected to afford the same time element as in hoisting.

The holding winding h of switch 2A is connected through a resistor $R^9$ across resistors $R^1$ and $R^2$ to afford said switch a time element in plugging in a well known manner. This switch 2a is not delayed by winding h in accelerating or decelerating.

In addition to the aforementioned control instrumentalities the controller includes a voltage relay VR of the normally open type having an operating winding o included in the dynamic circuit in parallel with resistor $R^8$. Also there is provided an electromagnetic relay UV which is of the normally open type and provided with an operating winding o, an electromagnetic relay 2CR which is normally closed and provided with an operating winding o, and an electromagnetic relay 1CR of the normally closed type having two windings o and $o^1$. The winding o of relay 1CR is a shunt winding, while the winding $o^1$ is included in the dynamic braking circuit to cause said relay to function in a well known manner hereinafter specified.

Figure 2:
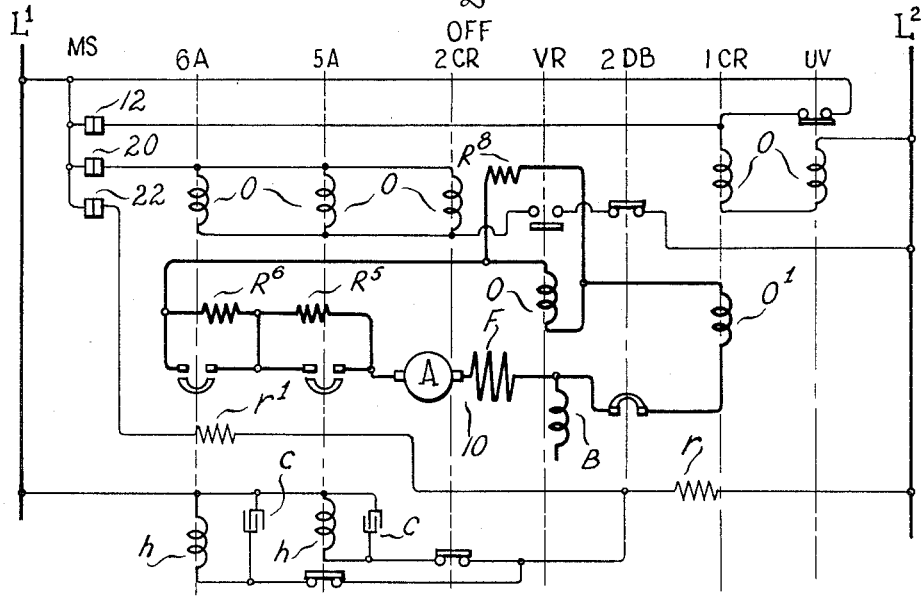
Fig. 2 is a simplified diagram of circuits with the master switch in off position.

Additionally the controller comprises a master switch MS which it may be assumed is of the cam operated type having pairs of contacts 12 to 22, respectively to bear the relation shown when the master switch is in off position and respectively to be engaged in other positions of the master switch as indicated by dots. In the off position of the master switch it will be noted that the contacts of the pairs 12, 20 and 22 are engaged while those of the remaining pairs are disengaged, and it is to be understood that where dots are lacking the corresponding contacts are disengaged. Thus as an example, the contacts of the pair 12 are disengaged in all positions of the master switch except off position. The left hand contacts of the several pairs are interconnected and are connected to line $L^1$ and to a contact of relay UV. The remaining right hand contacts are connected as follows:

12 to series connected windings o of 1CR and UV
13 to parallel connected windings o of 1KO and 1DB
14 to parallel connected windings o of 2DB and M
15 to winding o of 2KO
16 to winding o of H and to normally closed auxiliary contacts of 1KO
17 to winding o of 2A
18 to winding o of 3A
19 to winding o of 4A
20 to parallel connected windings o of 6A, 5A and 2CR
21 to winding o of 1A
22 to resistor $r^1$ of the potentiometer connection aforementioned Referring to Fig. 2 showing the connections established in the off position of the master switch, it will be observed that switch 2DB which is deenergized closes the dynamic braking loop containing the motor armature and field winding and permanent resistor $R^8$ in series relation, the winding of brake B being excluded and deenergized. As will be understood, deenergization of switch 2DB results from disengagement of MS contacts 14 as shown in Fig. 1, which contacts in disengaging also cause deenergization of main switch M. In Fig. 2 the resistors $R^5$ and $R^6$ also are shown as included in the dynamic braking circuit, the operating windings of their respective control switches being disconnected from circuit by VR. On the other hand, when the master switch is moved to off position from a lowering position with the motor still rotating VR, 2DB and MS contacts 20 complete circuit for the operating windings of 5A, 6A and 2CR to afford so-called graduated dynamic braking through operation of 5A and 6A sequentially for exclusion of resistors $R^5$ and $R^6$ sequentially subject to reinclusion thereof when VR releases as the motor comes to rest. In such action 5A and 6A are afforded time elements by their respective holding windings h for which potentiometer connection is made by MS contacts 22 in off position and in advance thereof, wherefore the time element of 5A and 6A in this decelerating action is the shorter of the two time elements hereinbefore referred to. As will be understood, 5A cannot respond until 2CR responds to interrupt through its down contacts the circuit of the holding winding h of 5A, whereas 6A cannot respond until 5A responds to interrupt through its down contacts the circuit of the holding winding h of 6A.

Incidentally in off position of the master switch its contacts 12 establish an energizing circuit for the windings o of UV and 1CR to effect response thereof assuming prior release of UV through failure of voltage or otherwise.

Figure 3:
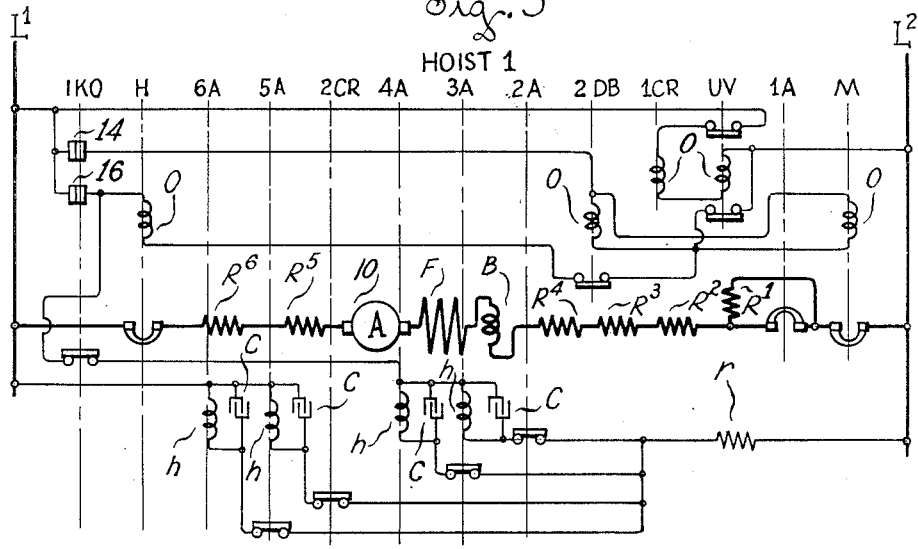
Fig. 3 is a simplified diagram of circuits with the master switch in the first hoist position.

Referring to Fig. 3 showing the connections established in the first hoist position of MS, the motor is connected by H and M to lines $L^1$ and $L^2$ with its armature and field winding in series and with the winding of brake B and resistors $R^2$ to $R^6$ included in circuit. In such position of the master only the contacts 14 and 16 are engaged and these contacts complete energizing circuits first for 2DB and M and then for H when 2DB has closed. Engagement of MS contacts 16 also completes circuits for the holding windings $h$ of 3A and 4A through auxiliary down contacts of 1KO and thus during the delay in response of switch H said windings $h$ and their associated condensers receive a charge of current which is the maximum charge because the potentiometer connection is interrupted by opening of MS contacts 22 upon movement of MS to its first hoisting position, as will appear from Fig. 1. Resistor $R^1$ is excluded from circuit because 1A is normally closed and its energizing circuit is never completed in hoisting.

The chart of Fig. 5 shows the results of further movement of MS for hoist control, and no doubt further explanation is unnecessary. However, it is desired to point out that 2A responds without delay except in plugging upon engagement of MS contacts 17 in the second hoist position, and in responding opens its auxiliary normally closed contacts to interrupt the circuit of the holding winding $h$ of 3A. Thus resistor $R^2$ is excluded from circuit without delay, and if meanwhile MS contacts 18 have been engaged by movement of MS to its third hoist position 3A is rendered responsive to exclude resistor $R^3$ subject to the time element provided by its respective winding $h$ and associated condenser. Similarly 3A in responding acts through its auxiliary down contacts to interrupt the holding circuit of 4A and thus permit 4A to respond subject to a time element, assuming MS to have been moved to its fourth hoist position to engage its contacts 19. The holding circuit of 5A is interrupted by 2CR which as shown in Figs. 1 and 2 has its winding $o$ in parallel with the windings $o$ of 5A and 6A and is not energized until MS contacts 20 are closed in the fifth hoist position and until auxiliary up contacts of 4A are closed. Thus 5A is insured the desired time element in closing following closure of 4A, and 5A in closing acts through auxiliary down contacts to open the holding circuit of 6A which meanwhile is maintained effective to insure a time element incident to response of 6A following response of 5A.

Referring now to Fig. 4 showing connections established in the first lowering position of MS, the motor at a point between its armature and its field winding is connected by 1KO to line $L^1$, 1KO having been energized by engagement of MS contacts 13 but subject to delay for prior response of 1DB energized by engagement of the same MS contacts and having auxiliary up contacts in the energizing circuit of 1KO. The purpose of this delay will be hereinafter set forth. Meanwhile and simultaneously with energization of 1DB the MS contacts 14 have caused energization of M and 2DB, thus connecting the motor armature and field winding in a parallel relation to line $L^2$, the winding of brake B being included in the field winding branch of the circuit, and energization of 2DB interrupting the dynamic braking circuit of Fig. 2. However, 1DB completes for the motor armature and field winding a closed loop including the winding of brake B, winding $o^1$ of 1CR, resistors $R^5$, $R^6$ and $R^8$.

In the first lowering position of MS resistor $R^1$ is excluded from circuit by the normally closed switch 1A and resistors $R^2$, $R^3$ and $R^4$ are quickly excluded from circuit without delay by their holding windings. This is due to the fact that $R^2$ is delayed only in plugging and to the fact that the holding windings of $R^3$ and $R^4$ do not have their circuits completed until 1KO responds to close its auxiliary up contacts, whereas the operating windings of all three switches 2A, 3A and 4A are energized simultaneously with 1KO. On the other hand, 5A and 6A cannot respond even though their MS contacts 20 are engaged because their operating windings have no connection to line $L^2$ pending response of 4A to close its auxiliary up contacts in circuit with said windings. Upon response of 4A the operating windings of 5A and 6A together with the operating winding of 2CR are energized and upon response of 2CR the holding circuit of 5A is opened as hereinbefore explained. Meanwhile the winding $h$ of 5A receives a charge of current to delay 5A in responding, but this charge is of a reduced value because of completion of the potentiometer connection by MS contacts 22. When 5A responds it acts through its auxiliary down contacts to interrupt the holding circuit of 6A which meanwhile receives a charge of current to delay response of 6A after interruption of its holding circuit. The time element of 6A like the time element of 5A is in this instance reduced because of establishment of the potentiometer connection.

Thus it will be apparent as indicated by the chart, Fig. 5, that if MS remains long enough in its first lowering position resistors $R^5$ and $R^6$ will also be excluded from circuit although their exclusion is not shown in Fig. 4 which shows only the connections at an earlier stage.

As indicated by the chart, Fig. 5, movement of MS to its second lowering position effects opening of 4A, 5A and 6A, this effecting reinsertion of resistors $R^4$, $R^5$ and $R^6$ without further motor circuit commutations. Deenergization of 4A, 5A and 6A is effected by disengagement of MS contacts 19 and 20, as will appear from Fig. 1. Likewise as indicated by the chart, Fig. 5, movement of MS to its third and fourth lowering positions effects sequential opening of 3A and 2A for reinsertion of resistors $R^3$ and $R^2$ sequentially, this being accomplished by disengaging MS contacts 18 in the third position and disengaging MS contacts 17 in the fourth position, as shown in Fig. 1. Also MS in its fourth position engages its contacts 15, as indicated in Fig. 1, this energizing 2KO as indicated by the chart, Fig. 5, to exclude resistor $R^7$ from the kickoff circuit.

Additionally MS in its fourth lowering position reengages its contacts 20, as indicated by Fig. 1 to effect reclosure of 5A and 6A, as indicated by the chart, Fig. 5, for again excluding resistors $R^5$ and $R^6$ for acceleration. Again 5A and 6A are subjected to control for response sequentially as hereinbefore set forth, response of each being delayed by its respective holding winding which in this instance affords the maximum time element because of interruption of the potentiometer connection of the windings $h$, said windings being in this instance connected across lines $L^1$ and $L^2$ through resistance $r$.

MS in its fifth lowering position, as indicated by Fig. 1, engages its contacts 21 to effect energization of 1A as indicated by the chart, Fig. 5, subject to control by 1CR, which has normally closed contacts in the energizing circuit of 1A. 1CR as will be understood provides high speed lowering which means that with no load on the hook substantially the same lowering speed is obtained with inclusion of resistor R¹ in the field circuit as is obtained with full load on the hook and with resistor R¹ excluded.

What we claim as new and desire to secure by Letters Patent is:

1. The combination with a motor, of control means therefor comprising means for selectively establishing different connections for said motor having resistance in common, said control means further comprising resistance varying means having delaying means of the condenser type rendered by said control means adjustable in respect of time element whereby different connections for said motor may be controlled by the same resistance varying means with a time element in one case substantially different from the time element in another case.

2. The combination with a motor, of control means therefor comprising means for selectively establishing hoisting connections and lowering connections including dynamic braking connections, said control means further comprising in common to said hoisting and lowering connections resistance varying means having delaying means of the condenser type rendered by said control means adjustable in respect of time element whereby both hoisting and lowering connections may be controlled by the same resistance varying means with a given time element in accelerating and a substantially different time element in decelerating in lowering.

3. The combination with a motor, of control means therefor comprising means for selectively establishing hoisting connections and lowering connections including dynamic braking connections, said control means further comprising in common to said hoisting and lowering connections resistance varying means having delaying means rendered adjustable by said control means in respect of time element to afford said resistance varying means a given time element in accelerating in hoisting and lowering and a substantially different time element in decelerating in lowering.

4. The combination with a motor, of control means therefor comprising means for selectively establishing hoisting connections and lowering connections including dynamic braking connections, said control means further comprising in common to said hoisting and lowering connections resistance varying means having delaying means of the condenser type adjustable by said control means in respect of time element to afford said resistance varying means a given time element in accelerating in hoisting and lowering and a substantially different time element in decelerating in lowering.

5. The combination with a motor, of control means therefor comprising means for selectively establishing different connections for said motor and further comprising resistance varying means having delaying means of the condenser type adjustable in respect of time element, said control means affording use of the same resistance varying means for controlling, subject to a given time element, certain of said motor connections and subject to a substantially different time element, other of said motor connections and affording under certain conditions the same operation of such resistance varying means free from delay by said delaying means.

6. The combination with a motor, of control means therefor comprising means for selectively establishing hoisting connections and lowering connections including dynamic braking connections, and further comprising in common to said hoisting and lowering connections resistance varying means having delaying means of the condenser type adjustable in respect of time element thereof, said control means for accelerating adjusting said delaying means for a given time element and for decelerating in lowering adjusting said delaying means for a different time element and said control means affording under certain conditions the same operation of said resistance varying means free from delay by said delaying means.

7. The combination with a motor, of control means comprising means for selectively establishing different connections for said motor, and further comprising in common to said different connections resistance varying means having delaying means of the condenser type with selective charging connections affording different charges to provide different time elements selectable by said control means for said different motor connections.

8. The combination with a motor, of control means therefor comprising means for selectively establishing different connections for said motor and further comprising in common to said different connections resistance varying means having delaying means of the condenser type with a line connection for charge thereof for a given time element, which line connection is convertible by said control means into a potentiometer type connection for charge of said delaying means for a different time element, said control means selecting the charging connection of said delaying means according to selection of motor connections.

9. The combination with a motor, of control means therefor comprising means for selectively establishing different connections for said motor and further comprising in common to said different motor connections resistance varying means having delaying means of the condenser type with a line connection for charge thereof for a given time element, which line connection is convertible by said control means into a potentiometer type connection for charge of said delaying means for a different time element, said control means selecting the charging connection of said delaying means according to selection of motor connections, and said control means affording the same operation of said resistance varying means free from delay by said delaying means but only in changing from certain motor connections to certain other motor connections.

10. In combination, a motor, means to establish different connections for said motor, resistance varying means common to said different motor connections, said resistance varying means having delaying means of the condenser type and a master switch controlling said first mentioned means to select the motor connections, said master switch establishing selectively different charging circuits for said delaying means to afford said delaying means one time element for certain motor connections and a substantially different time element for other motor connections.

11. In combination, a motor, means to establish different connections for said motor, resistance varying means common to said different motor connections, said resistance varying means having delaying means of the condenser type, and a master switch controlling said first mentioned means to select the motor connections, said master switch establishing selectively different charging circuits for said delaying means to afford said delaying means one time element for certain motor connections and a substantially different time element for other motor connections, and said master switch effecting the same operation of said resistance varying means free from delay by said delaying means when said master switch is moved to a given position from another given position.

12. In combination, a motor, means for selectively establishing therefor hoisting connections and lowering connections including dynamic braking connections, resistance varying means common to said hoisting and lowering connections and having delaying means of the condenser type to afford the same a time element in operating to effect a variation in resistance, and a master switch controlling said first mentioned means to select the motor connections, said master switch selectively establishing for said delaying means different charging connections thereby to afford said resistance varying means a time element in accelerating in hoisting and lowering substantially greater than the time element thereof in decelerating in lowering.

13. In combination, a motor, means for selectively establishing therefor hoisting connections and lowering connections including dynamic braking connections, resistance varying means common to said hoisting and lowering connections and having delaying means of the condenser type to afford the same a time element in operating to effect a variation in resistance, and a master switch controlling said first mentioned means to select the motor connections, said master switch selectively establishing for said delaying means different charging connections, thereby to afford said resistance varying means a time element in accelerating in hoisting and lowering substantially greater than the time element thereof in decelerating in lowering, and said master switch also affording the same operation of said resistance varying means free from delay by said delaying means when said master switch is moved from off position or from a hoisting position to a given lowering position.

14. In a motor controller, in combination, circuit commutating means, delaying means therefor of the condenser type, and selective charging connections for said delaying means comprising in one instance potentiometer type connections and in another instance a direct line connection in lieu of said potentiometer connections.

15. In a motor controller, in combination, circuit commutating means, delaying means therefor of the condenser type, said delaying means comprising a winding and a condenser connected in a loop with said winding, and means selectively to establish a power circuit for said loop with or without potentiometer type connections, said potentiometer type connections effecting a reduction in the charge of said winding and condenser.

16. In a motor controller, in combination, circuit commutating means, delaying means therefor of the condenser type, said delaying means comprising a plurality of windings, a plurality of condensers and a plurality of loops each including one of said windings and one of said condensers, and means to establish power connections for said loops inclusive or exclusive of potentiometer type connections, the power connections exclusive of said potentometer type connections and the power connections inclusive thereof providing respectively for a relatively long and a relatively short delaying action of each winding following interruption of its circuit.

PAISLEY B. HARWOOD.
JOHN M. NEWMAN.